United States Patent [19]
Rogers

[11] 3,880,242
[45] Apr. 29, 1975

[54] SWEEP ATTACHMENT

[76] Inventor: Thelmer A. Rogers, P.O. Drawer 1589, Lubbock, Tex. 79408

[22] Filed: Apr. 30, 1973

[21] Appl. No.: 355,524

[52] U.S. Cl. ............... 172/740; 172/253; 172/722; 172/753
[51] Int. Cl. ..................... A01b 15/06; A01b 39/22
[58] Field of Search ........... 172/719, 682, 722, 734, 172/769, 740, 732, 726, 372, 753, 748, 744, 751, 690, 699, 772, 721, 730, 683, 713, 720, 737, 762, 724, 766, 765, 700, 777, 778, 252, 253, 247; 37/141 T, 142 R, 142 A, 2; 403/373, 84, 86, 88

[56] References Cited
UNITED STATES PATENTS

| | | | |
|---|---|---|---|
| 396,277 | 1/1889 | Hart | 172/740 X |
| 487,120 | 11/1892 | Gilbert | 172/762 UX |
| 1,010,276 | 11/1911 | Letherman | 172/721 |
| 1,230,686 | 6/1917 | Dixon | 172/722 |
| 1,299,676 | 4/1919 | Campbell | 172/484 X |
| 1,546,654 | 7/1925 | Gustafson | 172/722 |
| 2,266,818 | 12/1941 | Seaholm | 172/722 |
| 2,416,006 | 2/1947 | Howard et al. | 172/740 |
| 2,625,870 | 1/1953 | Peacock et al. | 37/142 R |
| 2,666,272 | 1/1954 | Everett | 172/749 X |
| 2,716,823 | 9/1955 | Mullin | 172/753 X |
| 2,735,197 | 2/1956 | Struemph | 172/766 X |
| 2,893,499 | 7/1959 | Shollenberger | 172/740 |
| 3,713,497 | 1/1973 | Hawkins | 172/722 X |
| 3,752,236 | 8/1973 | Foster | 172/753 X |

*Primary Examiner*—Edgar S. Burr
*Assistant Examiner*—Steven A. Bratlie
*Attorney, Agent, or Firm*—Wendell Coffee

[57] ABSTRACT

A sweep with a flat horizontal plate has a pocket on the top of the plate. The pocket is formed of a conventional ripper point. A clamp attached to the plate behind the pocket forms means for attaching the plate in adjustable position to the end of a ripper so that a ripper plow may be quickly converted to a stubble mulcher having sweeps.

5 Claims, 5 Drawing Figures

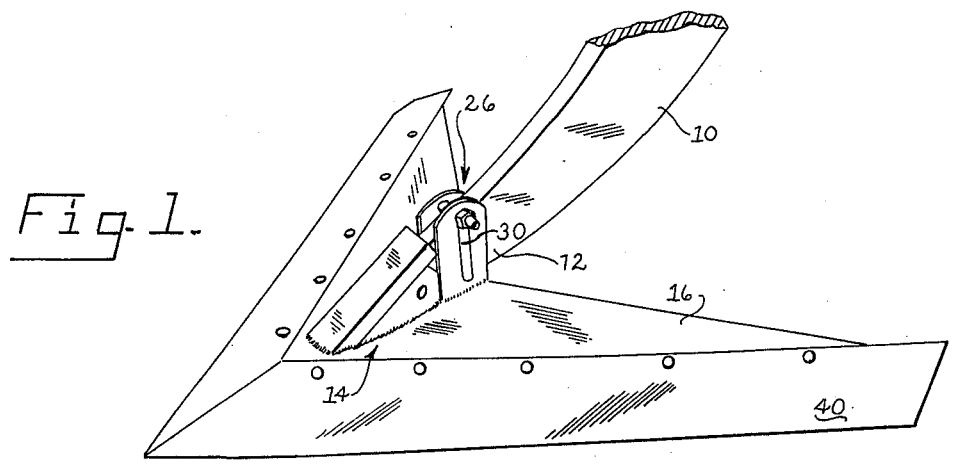
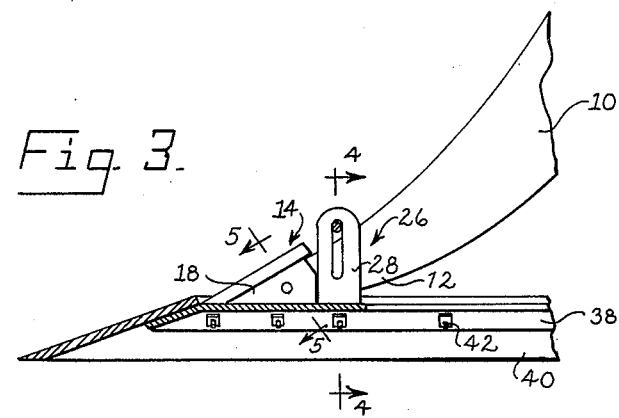
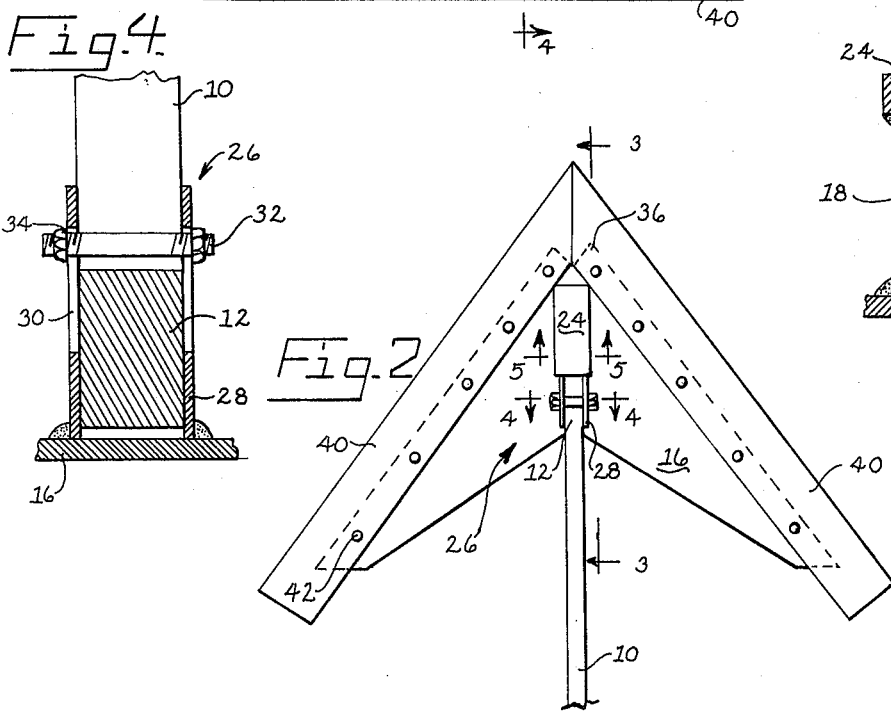
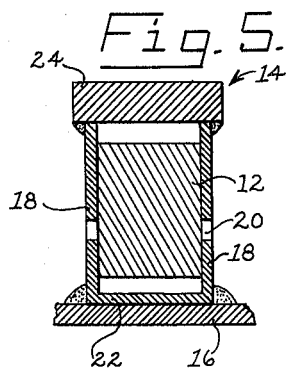

SWEEP ATTACHMENT

BACKGROUND OF THE INVENTION

1. Field of the Invention

This invention relates to plows and more particularly to heavy duty plows customarily in agricultural use.

2. Description of the Prior Art

Ripper type plows, such as disclosed in Sylvester U.S. Pat No. 3,450,212, have become common, popular agricultural implements. My prior U.S. Pat. No. 3,448,813 discloses a similar ripper plow with a vibrator attached thereto. Also, stubble mulchers or heavy duty sweeps to cultivate far beneath the surface of the earth are recognized as desirable agricultural implements. Such an implement is shown in Van Sickle et al U.S. Pat. No. 3,322,202. It is particularly seen in FIG. 3 of that patent how the sweep blade 148 is attached to the tillage tool, including the upright standards 102. Therefore, if the farmer were to want to convert from a ripper type operation to a sweep or stubble mulch operation, it would be necessary for him to have either a completely separate frame or it would be necessary for him to remove the standards or shanks from the frame and replace them. I.e., it would be necessary for him to remove his ripper shanks from the frame and insert the sweep shanks with the sweeps thereon. Conventionally, the rippers were included with points which were attached by a hole through the point and a hole through the ripper tip. SUMMARY OF THE INVENTION 1. New and Different Function I have invented a sweep which may be attached to the tip of the ripper in lieu of the point. Therefore, a farmer desiring to change from ripper operation to sweep or stubble mulch operation need not replace the whole ripper, but merely remove the point and attach the sweep. In addition to this, I have made the sweep attachment so it may be adjusted as to angle, i.e., it may dig or ride flat.

2. Objects of the Invention

An object of this invention is to cultivate the soil.

Another object is to provide an easily attachable heavy duty sweep to a ripper plow.

Other objects are to achieve the above with a device that is sturdy, compact, durable, lightweight, simple, safe, efficient, versatile, and reliable, yet inexpensive and easy to manufacture, install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a perspective view of an embodiment of my invention.

FIG. 2 is a top plan view thereof.

FIG. 3 is a side sectional view taken substantially on line 3—3 of FIG. 2.

FIG. 4 is a cross-sectional view taken substantially on line 4—4 of FIGS. 2 and 3.

FIG. 5 is a cross-sectional view taken substantially on line 5—5 of FIGS. 2 and 3.

DESCRIPTION OF THE PREFERRED EMBODIMENT:

Referring to the drawing, ripper 10 is a standard ripper. The ripper 10 is made of a flat plate which has tip 12 which angles forward and downward. Normally, the tip has a transverse hole (not shown) whereby a ripper point may be attached thereto. I have taken a ripper point and formed pocket 14 therefrom to be attached on the top of plate 16.

The pocket 14 includes two sides 18 which extend on either side of the ripper 10 and contact the sides of the ripper at the tip 12. It will be noted that these sides have illustrated in them hole 20. This is the hole by which the point, as a point, would be attached to the tip 12 of the ripper 10 as is seen in the prior patents of Sylvester and myself as identified above. The pocket 14 also includes bottom 22 which is attached to the plate 16. Top 24 angles forward and downward and the front extremity of the top 24 contacts the plate 16. The pocket 14 has an open back and the ripper tip 12 is inserted therein through the open back.

Clamp 26 is attached to the plate 16 behind the open back of the pocket 14. The clamp has two legs 28 which are attached to the plate 16. The legs 28 are aligned with the sides 18 so they also contact the sides of the ripper 10 at the tip 12. Each leg has elongated slot 30. Bolt 32 extends through these slots and above or over the ripper 10. Therefore, the clamp 26 forms a means for clamping the plate 16 to the ripper 10. The bolt 32 is threaded and has nut 34 on at least one end thereof.

The plate 16 is triangular with forward point 36. Sides 38 along the edge of the triangular plate, which are along the sides adjacent to the point 36, are sloped downward. Blades 40 are made of plow steel. The blades 40 are bolted by bolts 42 to the downward sloping sides 38. It may be seen that the plate 16 with the blades 40 form a sweep. Stout sweeps such as this are adapted to be run deeply and are called "stubble mulchers". It may be seen that the slot extends above the top of the ripper (FIGS. 3 and 4) so the angle of the plate may be adjusted, if desired, by the farmer.

Therefore, it may be seen that I have provided a sweep which may be readily and adjustable attached to a ripper.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In an agricultural implement including
   a ripper having
      i. a tip that
      ii. angles forward and downward;
   b. the improvement comprising:
   c. a horizontal oriented triangular plate with a forward point,
   d. the sides of the plate adjacent the forward point sloping downward,
   e. blades bolted to the sloping sides of the plate so that the plate with blades forms a sweep, f. a pocket consisting of a ripper tooth welded to the top of the plate, said ripper tooth having an open back,
g. the ripper tip in the pocket,
h. the pocket including
  i. two sides, one contacting each side the ripper,
  ii. a top which is sloped downward and forward over the top of the ripper tip, and
j. a clamp formed of two legs open at the top,
  i. an elongated slot through each leg of the clamp, and
  ii. a bolt through the slots, thus closing the open top,
k. the clamp welded to the plate aligned with the pocket,
m. one of the legs of the clamp contacting each side of the ripper, and
n. the bolt through the slots extending across the top of the ripper holding the sweep securely to the ripper.

2. An earth working device adapted to be attached to
a. a ripper having
  i. a tip that
  ii. angles forward and downward;
b. comprising:
c. a plate adapted to be carried in a horizontal position to which may be attached earth working tools,
d. a pocket consisting of a ripper tooth welded to the top of the plate, said ripper tooth having an open back,
e. the pocket including
  i. two sides, one adapted to contact each side of the ripper,
  ii. a top which slopes downward and contacts the plate at the forward extremity of the top, and
  iii. a bottom in contact with the plate,
f. a clamp at the open back of the pocket formed of
  i. two legs open at the top and attached to the plate,
  ii. the legs aligned with the sides of the pocket, and, therefore, adapted to contact each side of the ripper, and
  iii. an elongated slot through each leg,
  iv. the elongated slots adapted to receive a bolt so the bolt will be across the open top to clamp the legs together on the ripper to hold the plate thereto.

3. The invention as defined in claim 2 wherein
g. the plate is attached to a ripper, and
h. a bolt is through the slots.

4. The invention as defined in claim 2 wherein
g. the plate is triangular with a forward point,
h. the sides of the plate adjacent the forward point sloping downward, and
j. said earth working tools are in the form of blades bolted to the downward sloping sides.

5. The invention as defined in claim 4 wherein
k. the plate is attached to a ripper, and
m. a bolt is through the slots.

* * * * *